(12) United States Patent
McGrath et al.

(10) Patent No.: US 7,790,837 B2
(45) Date of Patent: Sep. 7, 2010

(54) ION-CONDUCTING SULFONATED POLYMERIC MATERIALS

(75) Inventors: James E. McGrath, Blacksburg, VA (US); Michael Hickner, Blacksburg, VA (US); Feng Wang, Blacksburg, VA (US); Yu-Seung Kim, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 12/035,087

(22) Filed: Feb. 21, 2008

(65) Prior Publication Data

US 2008/0275146 A1  Nov. 6, 2008

(51) Int. Cl.
C08G 75/20 (2006.01)
(52) U.S. Cl. .......... 528/391; 521/27; 528/170; 528/321; 528/363; 528/364
(58) Field of Classification Search ........... 528/391, 528/321, 363, 364, 170; 521/27
See application file for complete search history.

(56) References Cited

U.S. PATENT DOCUMENTS

| | | | |
|---|---|---|---|
| 5,272,217 A | 12/1993 | Miller et al. | |
| 5,731,105 A | 3/1998 | Fleischer et al. | |
| 5,919,583 A * | 7/1999 | Grot et al. | 429/33 |
| 6,248,469 B1 | 6/2001 | Formato et al. | |
| 6,258,272 B1 | 7/2001 | Wang et al. | |
| 6,465,136 B1 * | 10/2002 | Fenton et al. | 429/309 |
| 6,586,561 B1 * | 7/2003 | Litt et al. | 528/353 |
| 6,670,065 B2 | 12/2003 | Koyama | |
| 7,038,004 B2 * | 5/2006 | Chen et al. | 528/86 |
| 2002/0061431 A1 | 5/2002 | Koyama | |
| 2003/0096149 A1 | 5/2003 | Koyama | |
| 2004/0033407 A1 | 2/2004 | Koyama | |

FOREIGN PATENT DOCUMENTS

JP 9-245818 9/1997
WO WO-02/25764 A1 * 3/2002

OTHER PUBLICATIONS

Gunduz et al., Polymer Preprint, vol. 41(1), pp. 182-183 (Mar. 2000).*

(Continued)

*Primary Examiner*—Peter D. Mulcahy
*Assistant Examiner*—Henry Hu
(74) *Attorney, Agent, or Firm*—Whitham Curtis Christofferson & Cook, PC

(57) ABSTRACT

Sulfonated polymers are made by the direct polymerization of a sulfonated monomer to form the sulfonated polymers. The types of sulfonated polymers may include polysulfones or polyimides. The sulfonated polymers can be formed into membranes that may be used in proton exchange membrane fuel cells or as ion exchange membranes. The membranes formed from the sulfonated polymers exhibit improved properties over that of Nafion®. A heteropoly acid may be added to the sulfonated polymer to form a nanocomposite membrane in which the heteropoly acid is highly dispersed. The addition of a heteropoly acid to the sulfonated polymer increases the thermal stability of the membrane, enhances the conductivity above 100° C., and reduces the water uptake of the membrane.

3 Claims, 8 Drawing Sheets

OTHER PUBLICATIONS

Kim et al. Journal of Membrane Science, vol. 212, pp. 263-282 (2003).*

Kim et al, Heteropolyacid/sulfonated poly(arylene ether sulfone) composites for proton exchange membranes fuel cells, 2001, Chem Abstract 135: 360132.

N. Gunduz, et al., "Synthesis and Characterization of Sulfonated Polymides", Polymer Reprints, vol. 41, No. 1, pp. 182-183 (Mar. 2000).

F. Wang, et al., "Synthesis of Sulfonated Poly (Arylene Ether Sulfone)s via Direct Polymerization", Polymer Reprints, vol. 41, No. 1, pp. 237-238 (Mar. 2000).

H. Shobha, et al., "Synthesis and Characterization of Sulfonated Poly(Arylene Ether)s Based on Functionalized Triphenyl Phosphine Oxide for Proton Exchange Membranes", Polymer Reprints, vol. 41, No. 1, pp. 180-181 (Mar. 2000).

Mecham, J. et al. "Synthesis and characterization of controlled molecular weight sulfonated amino-functional poly(acrylene ether sulfone)s prepared by direct polymerization". Polym. Prepr., 41(2), pp. 1388-1389, Aug. 2000.

Wang et al. "Synthesis of sulfonated poly(arylene ether sulfone)s via direct polymerization", Mar. 2000; Chem Abstract 132: 334953.

Hickner et al.; "Proton Exchange Membrane Nanocomposites"; Proceedings of the American Society for Composites, 16th Technical Conference, M.W. Hyer and A.C. Loos, Eds., Sep. 9-12, 2001, Blacksburg, VA (Paper No. 225).

* cited by examiner

ION-CONDUCTING SULFONATED POLYMERIC MATERIALS

The invention was made using funds from grants by the National Science Foundation Science and Technology Center (DMR 9120004), The Office of Naval Research (N00014-91-5-1037) and the National Science Foundation (EHR 0090556). The United States Government may have certain rights in the invention.

The present application is based on U.S. Provisional Application 60/234,177 filed on Sep. 20, 2000; U.S. Provisional Application 60/311,350 filed on Aug. 13, 2001; and U.S. Provisional Application 60/311,360, filed on Aug. 13, 2001, the complete contents of the aforementioned provisional applications are herein incorporated by reference in their entireties.

FIELD OF THE INVENTION

The present invention is directed to ion-conducting sulfonated polymeric materials formed from the direct polymerization of a sulfonated monomer with at least one other monomer to form a sulfonated polymer. These sulfonated polymers have particular application in proton exchange membranes for fuel cells and for ion exchange membranes. In addition, this invention has application in the synthesis of sulfonated polysulfones and sulfonated polyimides in proton exchange membranes.

BACKGROUND OF THE INVENTION

Polymer electrolyte fuel cells (PEFCs) have great potential as an environmentally friendly energy source. Fuel cells have been used in the space program since the 1960's, but recently with the focus on "green" resources, fuel cells have come to the forefront of commercialization. Specifically, fuel cells are being explored for use in automobiles, electronics, and stationary power applications.

Perhaps the most critical component of the fuel cell is the proton exchange membrane (PEM). For the last 30 years, the industry standard for the PEM component of the fuel cell has been Nafion® (polyperfluoro sulfonic acid) by DuPont.

Nafion® membranes display sufficient proton conductivity (~0.1 S/cm), good chemical resistance, and mechanical strength. Some of the membrane's disadvantages include high cost, reduced conductivity at high temperatures (>80° C.), and high methanol permeability in direct methanol fuel cells.

Increasing the operation temperature of fuel cells is important for several reasons. Firstly, higher operating temperatures in the fuel cell decreases the carbon monoxide poisoning of the electrocatalyst. Carbon monoxide in concentrations of a few parts per million can adversely affect performance at temperatures around 80° C. Secondly, higher temperatures increase reaction kinetics of hydrogen oxidation on the anode and oxygen reduction on the cathode. However, as the temperature is increased, it becomes more difficult to keep the membrane hydrated. Dehydrated membranes lose ionic conductivity and result in poor contact between fuel cell components due to shrinkage of the membrane. The challenge is to produce membranes not limited by the temperature range of liquid water.

Because of the renewed interest in fuel cells and the challenge of high temperature operation, new membrane materials have been explored as potential replacements for Nafion®. Previous work has focused on sulfonated polystyrene, styrene-butadiene block copolymers, or poly(arylene ether)s such as PEEK. Typically, these polymers were all made by a post-sulfonation polymer modification reaction where the sulfonic acid groups are attached to the already formed polymer backbone.

Sulfonated poly (arylene ether sulfone)s made from post-polymerization sulfonation reactions have been of interest since the pioneering work of Noshay and Robeson, who were able to develop a mild sulfonation procedure for the commercially available bisphenol-A based poly(ether sulfone). This approach found considerable interest in the area of desalinization membranes for reverse osmosis and related water purification areas. In the post-polymerization sulfonation reaction, the sulfonic acid group is restricted to certain locations on the polymer chain. In this example of the bisphenol A based systems illustrated as Structure 1, the sulfonic acid group is almost always restricted to the activated position ortho to the aromatic ether bond. Additionally for this system, only one sulfonic acid group per repeat unit is typically achieved. Structure 1. Bisphenol A Based System where x is $-C(CH_3)_2-$.

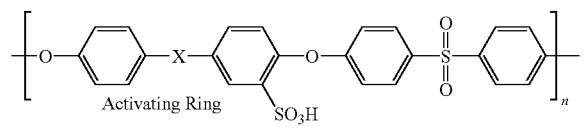

SUMMARY OF THE INVENTION

The present invention provides sulfonated copolymers, membranes and materials that exhibit improved thermal stability as well as improved protonic conductivity in fuel cell applications.

The present invention is directed towards polymerizing a sulfonated activated aromatic monomer and an unsulfonated activated aromatic monomer with a suitable comonomer such as a bisphenol to produce a sulfonated aromatic copolymer.

One embodiment of the invention includes a sulfonated copolymer having the following chemical structure:

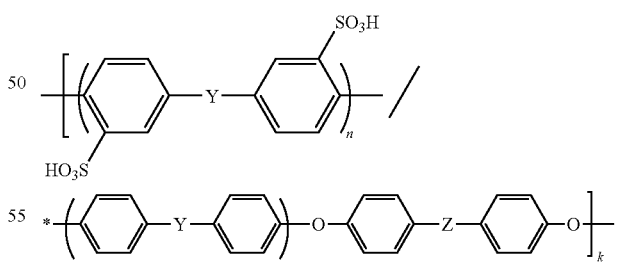

where n/n+m ranges from about 0.001 to about 1. Y may be selected from the group consisting of $-S-$, $S(O)-$, $-S(O)_2-$, $-C(O)-$, $-P(O)(C_6H_5)-$ or combinations thereof. Z may be selected from the group consisting of a direct carbon-carbon single bond, $-C(CH_3)_2-$, $-C(CF_3)_2-$, $-C(CF_3)(C_6H_5)-$, $-C(O)-$, $-S(O)_2-$, and $-P(O)(C_6H_5)-$. In a preferred embodiment, n/n+m ranges from about 0.3 to about 0.6.

The invention also includes a proton exchange membrane that includes a sulfonated copolymer having the chemical structure:

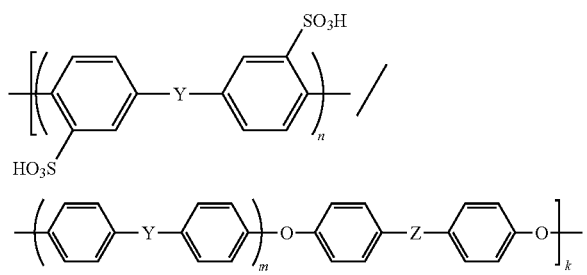

where n/n+m ranges from about 0.001 to about 1. Y may be selected from the group consisting of —S—, S(O)—, —S(O)$_2$—, —C(O)—, —P(O)(C$_6$H$_5$)— or combinations thereof. Z may be selected from the group consisting of a direct carbon-carbon single bond, —C(CH$_3$)$_2$—, —C(CF$_3$)$_2$—, —C(CF$_3$)(C$_6$H$_5$)—, —C(O)—, —S(O)$_2$—, or —P(O)(C$_6$H$_5$)—. In one embodiment, this proton exchange membrane includes an inorganic heteropoly acid. The inorganic heteropoly acid may be selected from the group consisting of phosphotungstic acid, phosphomolybdic acid, and zirconium hydrogen phosphate. In a preferred embodiment, the inorganic heteropoly acid is phosphotungstic acid in an amount ranging from about 10% to about 60% by weight.

Another embodiment of the present invention includes a sulfonated copolymer having the following chemical structure:

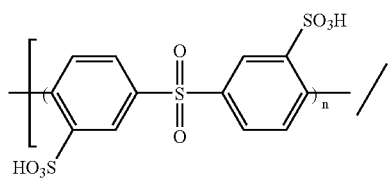

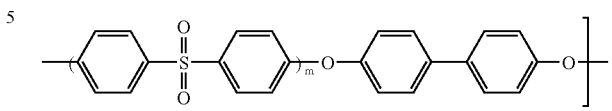

where n/n+m ranges from about 0.001 to about 1. In one preferred embodiment, n/n+m ranges from about 0.3 to about 0.6.

The invention also includes a sulfonated polysulfone comprising at least one sulfonate moiety on a deactivated aromatic ring adjacent to a sulfone functional group of a polysulfone.

The invention also includes a proton exchange membrane comprising a sulfonated copolymer having the following chemical structure:

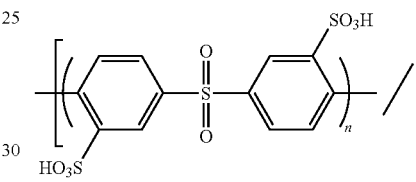

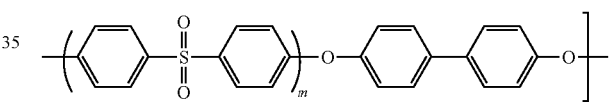

where n/n+m ranges from about 0.001 to about 1. In one preferred embodiment, n/n+m ranges from about 0.3 to about 0.6. This proton exchange membrane may include an inorganic heteropoly acid. The inorganic heteropoly acid may be selected from the group consisting of phosphotungstic acid, phosphomolybdic acid, and zirconium hydrogen phosphate. In one preferred embodiment, the inorganic heteropoly acid is phosphotungstic acid in an amount ranging from about 10% to about 60% by weight.

Further, the invention includes a sulfonated polyimide having the following chemical structure:

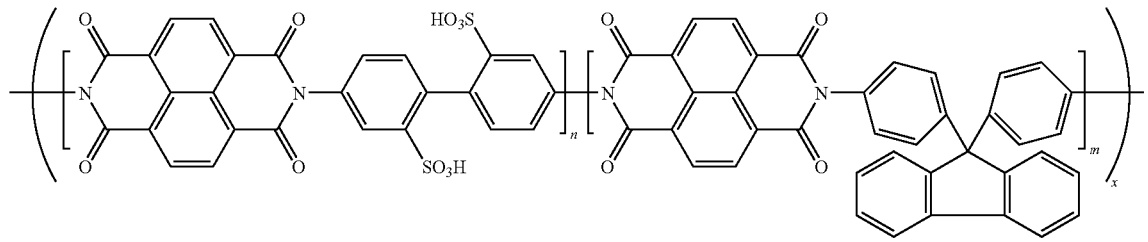

where n/n+m ranges from about 0.001 to about 1.

The invention also includes a proton exchange membrane comprising a sulfonated polyimide membrane formed from a sulfonated polymer having the chemical structure:

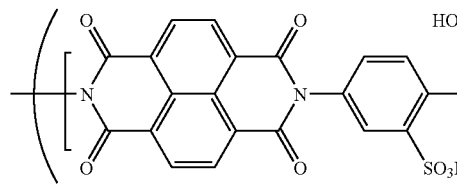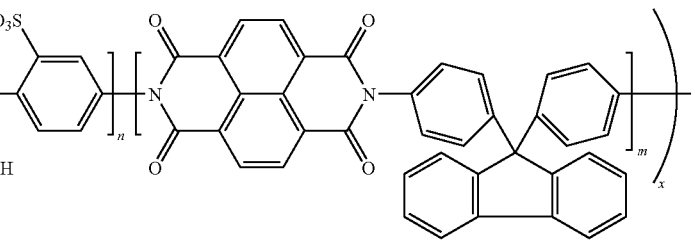

where n/n+m ranges from about 0.001 to about 1. This proton exchange membrane may also include an inorganic heteropoly acid. The inorganic heteropoly acid may be selected from the group consisting of phosphotungstic acid, phosphomolybdic acid, and zirconium hydrogen phosphate. In one preferred embodiment, the inorganic heteropoly acid is phosphotungstic acid in an amount ranging from about 10% to about 60% by weight.

The invention also includes a method for making a sulfonated polymer comprising the step of reacting a monomer having at least one sulfonate group and having at least two leaving groups and a comonomer having at least two leaving groups to form a sulfonated polymer, whereby the leaving groups are removed by condensation of the monomer and comonomer. In one embodiment, the monomer is 3,3'-disulfonated 4,4'-dichlorodiphenyl sulfone. In another embodiment, the monomer includes 3,3'-disulfonated 4,4'-dichlorodiphenyl sulfone and 4,4'-dichlorodiphenyl sulfone in a molar ratio ranging from about 0.001 to 0.999. The comonomer may be selected from the group consisting of 4,4'-biphenol, hydroquinone, 6F-bisphenol, and phenyl phosphine oxide bisphenol. In one preferred embodiment, the comonomer is 4,4' biphenol. The sulfonate groups may be in the salt form or in the form of sulfonic acid groups.

Still further, the invention includes a method for making a sulfonated polysulfone comprising the step of condensing a sulfone monomer having at least one sulfonate group attached to an aromatic ring adjacent to a sulfone functional group of the sulfone monomer and a comonomer to form a sulfonated polymer. The monomer may include 3,3'-disulfonated 4,4'-dichlorodiphenyl sulfone and 4,4'-dichlorodiphenyl sulfone in a molar ratio ranging from about 0.001 to 0.099.

Another embodiment of the invention includes a method for making a sulfonated polyimide comprising the step of polymerizing an aromatic diamine having at least one sulfonate moiety attached to an aromatic ring of the aromatic diamine with a dianhydride to form a sulfonated polyimide. The aromatic diamine may be selected from the group consisting of 2,5-phenylenediamine sulfonic acid, 2,5-phenylenediamine sulfonate, 4,4'-diamino-biphenyl-2,2'-disulfonic acid, and 4,4'-diamino-biphenyl-2,2'-disulfonate. The dianhydride may be selected from the group consisting of a hexafluorodianhydride, and 3,3',4,4'-biphenyl tetracarboxylic dianhydride. The step of polymerizing an aromatic diamine may also include a second diamine. In a preferred embodiment, the ratio of said aromatic diamine to said second diamine may range from about 0.001 to about 0.999. The sulfonate groups may be in the salt form or in the form of sulfonic acid.

DETAILED DESCRIPTION OF THE INVENTION

Figure 1:
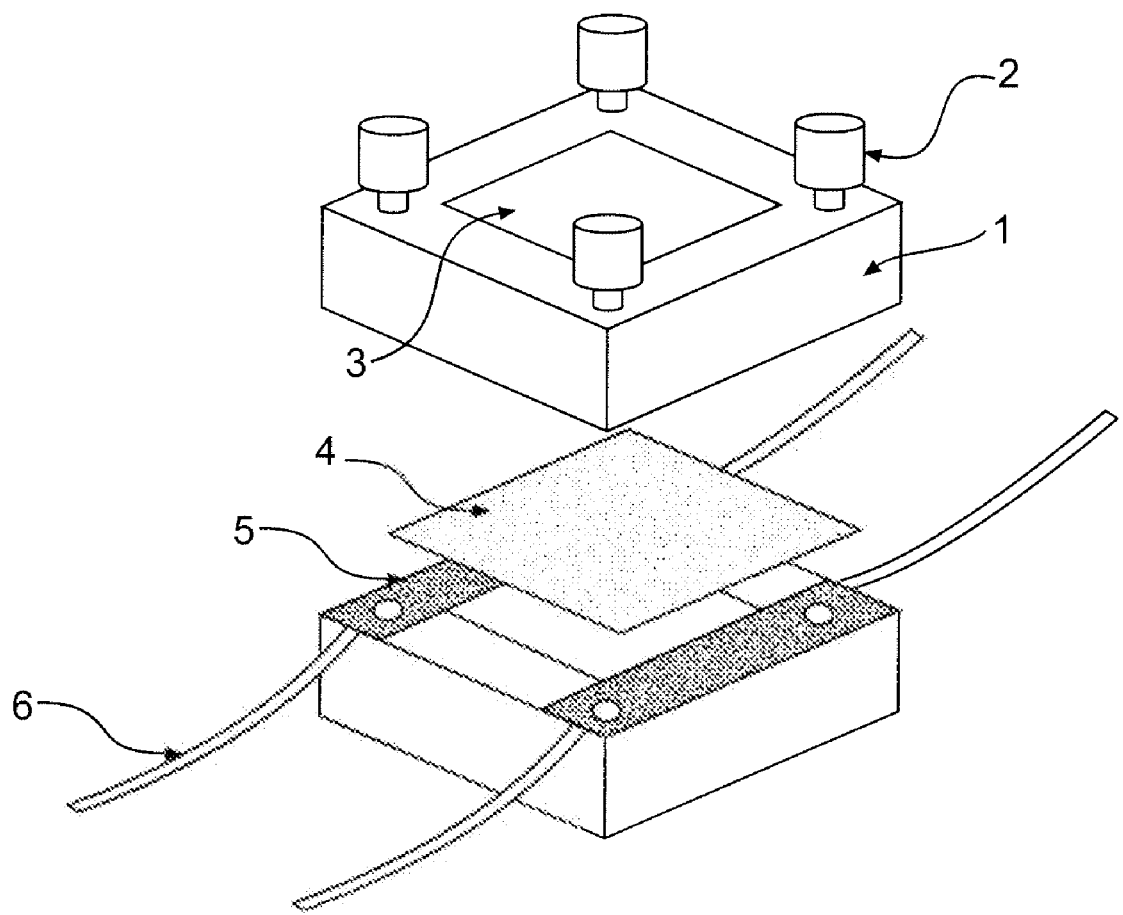
FIG. 1 is an illustration of a conductivity cell with a membrane.

Ion-conducting sulfonated polymeric materials are formed by the direct polymerization of sulfonated monomers. These sulfonated polymers may be used to form membranes that have applications in fuel cell and ion exchange technology. In particular, the membranes may be used in hydrogen, direct methanol, reformate, and other direct oxidation fuel cells. By using sulfonated monomers in the polymerization process, the concentration of sulfonated monomers may be varied with respect to an unsulfonated monomer and a comonomer to control the concentration of sulfonate groups in the resulting copolymer.

Further, by using sulfonated monomers, control over the location of the sulfonate group on the polymer is also achieved. For example, as was illustrated in Structure 1, the post-polymerization sulfonation of the bisphenol poly (arylene ether sulfone) results in the sulfonation of the activated ring. By starting with the sulfonated monomer, followed by direct polymerization, sulfonation is maintained on the deactivated ring, as shown in Structure 2. By controlling the concentration and location of sulfonate groups in the polymer, various properties of the resulting membrane, such as conductivity and water content, may be controlled. Direct polymerization of sulfonated monomers allows for well-defined ion conductor locations, high protonic conductivity, and enhanced stability over polymer electrolytes synthesized by post-sulfonation reactions. Structure 2.

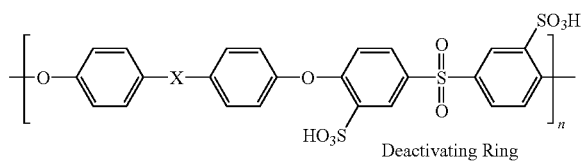

As used herein, "sulfonate" or "sulfonated" refers to a sulfonate group, i.e., —SO$_3$, either in the acid form (—SO$_3$H, sulfonic acid) or the salt form (—SO$_3$Na). The cation for the salt form may be sodium, potassium, cesium, or other metal, inorganic, or organic cation.

Further, when the term "polymer" is used, it is used broadly and includes homopolymers, random copolymers, and block copolymers.

mechanical properties, as well as resistance to oxidation and acid catalyzed hydrolysis. These properties typically improve when the number of aliphatic units is decreased.

Generally, the invention is directed to the direct polymerization of a sulfonated activated aromatic monomer, an unsulfonated activated aromatic monomer, and a comonomer, such as bisphenol, to form a sulfonated aromatic copolymer. Activating groups for the monomers may include —S—, —S(O)—, —S(O)$_2$—, —C(O)—, and —P(O)(C$_6$H$_5$)—. The monomers may be in the dihalide or dinitro form. Halides would include, but are not limited to Cl, F, and Br.

The sulfonated activated aromatic dihalide is prepared by sulfonation of the corresponding activated aromatic dihalide by sulfonation methods known to those skilled in the art. This sulfonated activated aromatic dihalide may then used in the formation of the sulfonated copolymer. The general reaction scheme for forming the sulfonated copolymer is shown in Scheme 1 below.

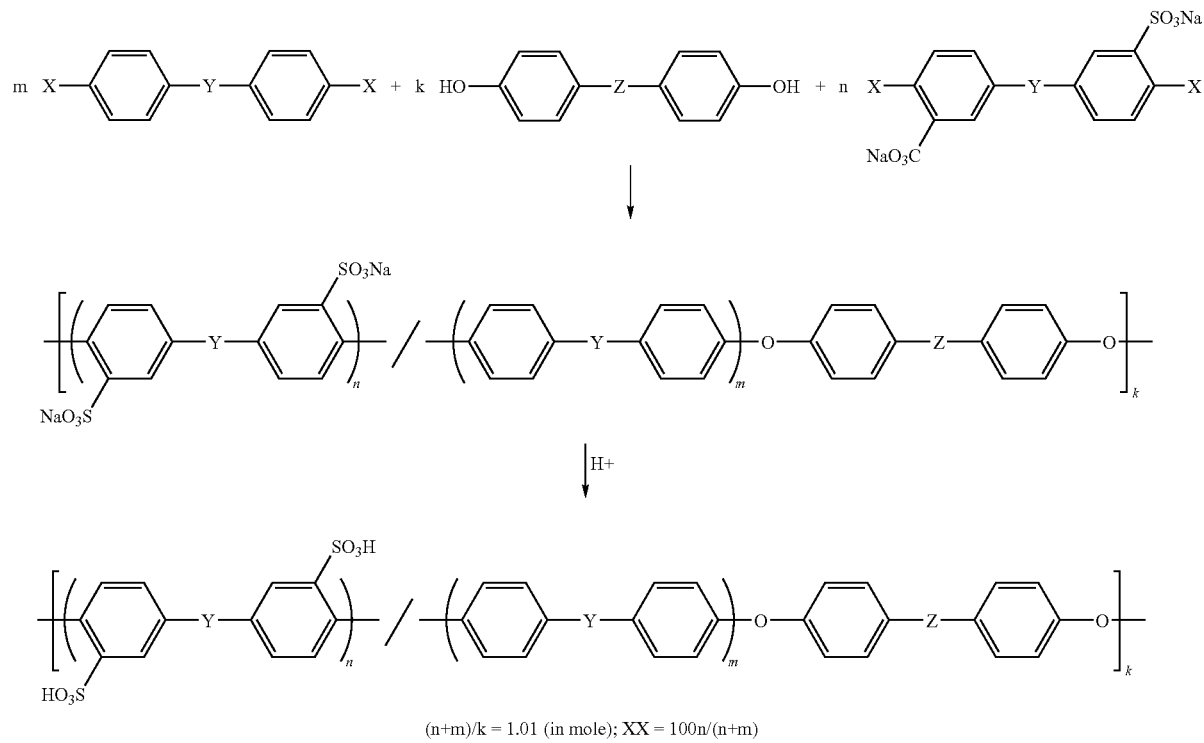

Many different types of polymers may be formed in accordance with the present invention. Control over the concentration and location of the sulfonate groups on the polymer may be achieved by using the appropriate sulfonated monomer in conjunction with a suitable comonomer. Specific examples of the types of polymers include, but are not limited to, polysulfones, polyimides, polyketones, and poly(arylene ether phosphine oxide)s.

For fuel cell applications, it is important that the proton exchange membrane of the fuel cell be conductive and have good mechanical strength. Aromatic polymers, such as poly (arylene ether sulfone)s, typically have excellent thermal and In scheme 1, Y may be any group that activates the leaving group X. In one embodiment Y may include, but is not limited to, —S—, S(O)—, —S(O)$_2$—, —C(O)—, —P(O)(C$_6$H$_5$)— or combinations thereof. The activating group for the sulfonated monomer may be the same or different from the unsulfonated monomer. X may be any activated leaving group such as a dihalide or a dinitro group. Preferable dihalides include, but are not limited to, Cl, F, or Br. In the bisphenol, Z may be a direct carbon-carbon single bond, —C(CH$_3$)$_2$—, —C(CF$_3$)$_2$—, —C(CF$_3$)(C$_6$H$_5$)—, —C(O)—, —S(O)$_2$—, or —P(O)(C$_6$H$_5$)—. Further, while Scheme 1 is illustrated using phenyl groups as the aromatic group, other aromatic moieties may be used. These include, but are not limited to phenyl, napthyl, terphenyl, and combinations thereof.

The molar ratio of sulfonated activated aromatic monomer to activated aromatic monomer may range from about 0.001 to about 0.999. The comonomer, such as bisphenol, is used in sufficient stoichiometric amounts to produce the sulfonated copolymer.

The following discussion will be with respect to the formation of a sulfonated polysulfone; however, one skilled in the art will understand that much of the discussion is applicable to the other types of polymers discussed above and are within the scope of the present invention.

One embodiment of the present invention includes a sulfonated aromatic sulfone where there is at least one sulfonate moiety on an aromatic ring adjacent to a sulfone functional group of a polysulfone. The aromatic ring, due to its proximity to the sulfone group, is deactivated for sulfonation reactions. Sulfonation on the deactivated aromatic ring is accomplished by sulfonating the corresponding monomer followed by polymerization to form the polysulfone. In this way, sulfonation of the deactivated ring is maintained.

The formation of the sulfonated polysulfone polymer takes place by selecting or creating the desired sulfonated monomer, which is typically in the form of a dihalide. The sulfonated monomer is then condensed with an appropriate comonomer, such as a bisphenol, to form the sulfonated polysulfone polymer. The sulfonated monomer may be added alone or in conjunction with an unsulfonated monomer. One particularly useful sulfonated monomer is 3,3'-disulfonated 4,4' dichlorodiphenyl sulfone (SDCDPS), shown in structure 3. While the dichloro-form is discussed, other dihalide forms, such as the fluoro form may be used. Structure 3.

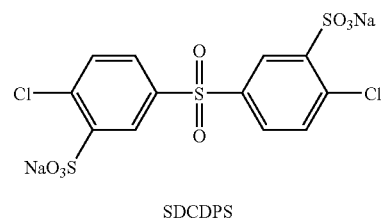

SDCDPS

As mentioned earlier, an unsulfonated monomer may be added with the sulfonated monomer to form the sulfonated copolymer. The unsulfonated monomer may vary depending on the desired properties of the resulting polymer or membrane. When 3,3'-disulfonated 4,4' dichlorodiphenyl sulfone is used, one useful unsulfonated monomer is 4,4'-dichlorodiphenyl sulfone (DCDPS). The relative molar ratio of sulfonated monomer to unsulfonated monomer will vary depending on the desired properties of the material and can range from about 0.001 to about 1, preferably from about 0.3 to about 0.6. As mentioned above, other activating groups other than the sulfone group may be used.

The comonomer used to form the polysulfone may also vary depending on the desired properties and application of the resulting membrane. In one embodiment, bisphenol is used as the comonomer. For proton exchange membranes where mechanical strength and heat tolerance is important, 4,4'-biphenol, hydroquinone, 6F-bisphenol, phenyl phosphine oxide bisphenol, or other aromatic bisphenols may be used as the comonomer. Further, the bisphenol may include additional aliphatic or aromatic substituents.

One embodiment of the invention includes the direct condensation of 3,3'-disulfonated 4,4' dichlorodiphenyl sulfone and dichlorodiphenyl sulfone with 4,4'-biphenol to form sulfonated poly(arylene ether sulfone)s as shown in Scheme 2.

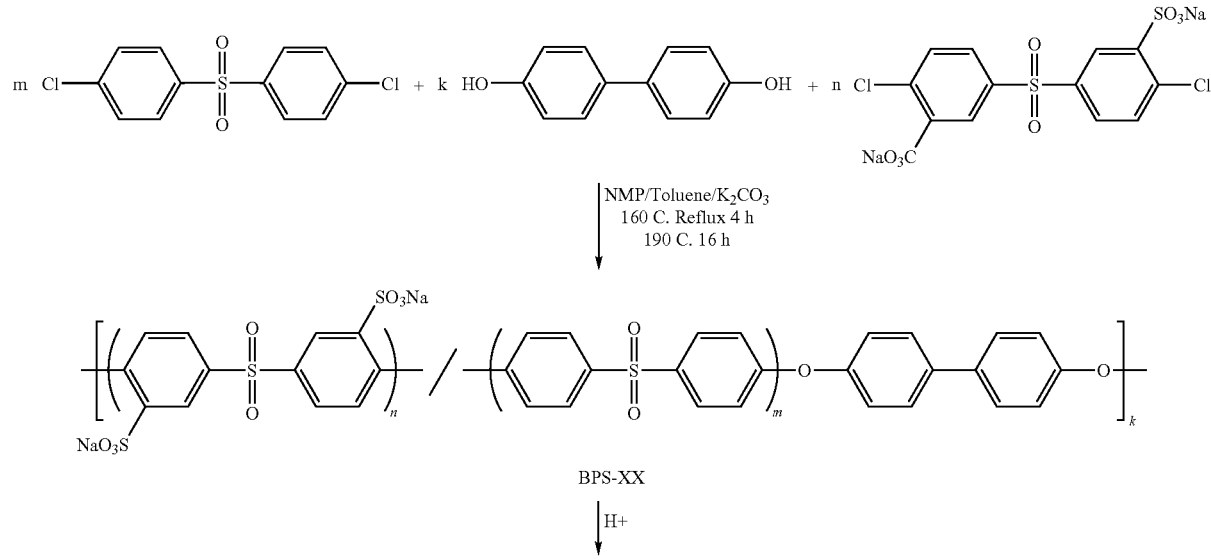

-continued

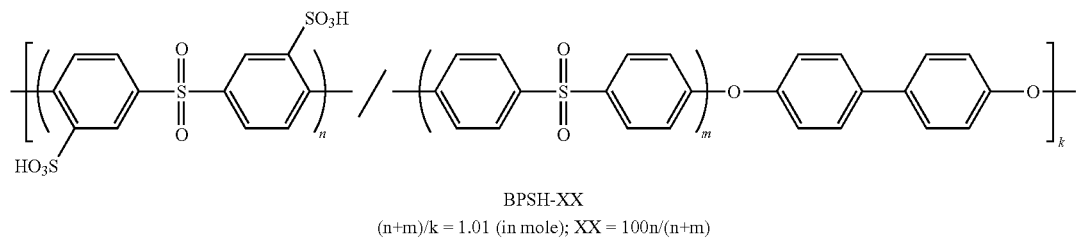

BPSH-XX
(n+m)/k = 1.01 (in mole); XX = 100n/(n+m)

While scheme 2 illustrates SDCPDS and DCPDS condensing with 4,4'-biphenol, it should be understood the method of this invention and fuel cells formed thereby, contemplate any aromatic sulfonated monomer including one or more aromatic groups and one or more sulfonate moieties located on the aromatic groups which includes leaving groups that react with corresponding leaving groups on any comonomer, particularly including, but not limited to, bisphenols, by a condensation reaction. The comonomer may itself be substituted with a sulfonate moiety. The polymer produced includes a molar ratio of sulfonated activated aromatic monomer to activated aromatic monomer ranging from about 0.001 to about 1, and preferably from about 0.3 to about 0.6.

Membranes may be formed from the sulfonated copolymers by methods known to those skilled in the art. These membranes can find application as proton exchange membranes in fuel cells or as ion exchange membranes in ion exchange applications.

One method for forming a membrane includes dissolving the sulfonated polymer in a suitable solvent such as DMAC and followed by casting directly onto a glass substrate. As more fully discussed in Example 1 below, these membranes exhibited conductivities equal to or greater than known Nafion® membranes and have particular application in fuel cell technology. One embodiment of the invention includes a proton exchange membrane that includes a polymer made from the direct polymerization of a sulfonated monomer and a comonomer where the membrane has a conductivity of at least about 0.005 S/cm.

Another example of a useful sulfonated polymer is the sulfonated polyimide. As with the sulfonated polysulfone, a sulfonated monomer is used in the polymerization process. General routes for the preparation of polyimides known to those skilled in the art may be used to form the polyimide, including forming the polyimide by an ester acid reaction or by thermal imidization.

Examples of suitable sulfonated diamine monomers include, but are not limited to, 2,5-phenylenediamine sulfonic acid (PDA-H), 2,5-phenylenediamine sulfonate, 4,4'-diamino-biphenyl-2,2'-disulfonic acid, or 4,4'-diamino-biphenyl-2,2'-disulfonate. The cation of the sulfonate form of the diamine is not typically crucial and may vary between different metals or other inorganic or organic cations. Examples of typical metal cations include, but are not limited to, potassium, sodium, and cesium.

When an unsulfonated diamine is used in conjunction with a sulfonated diamine, the unsulfonated diamine may vary depending on the properties of the desired membrane. Examples of some suitable unsulfonated diamine include, but are not limited to, 4,4'-fluorenylidene dianiline (FDA), 4,4'-diaminodiphenylsulfone (DDS), and other similar diamines such as oxydianiline. Functional groups other than the sulfone functional group, such as a ketone, phosphine oxide and the like may also find application in these polymers. The ratio of sulfonated diamine to the unsulfonated amine may vary depending on the desired properties of the membrane and may range from about 0.001 to about 1.

The dianhydride should be added in sufficient stoichiometric amounts to form the polyamide. These amounts are readily determinable by one skilled in the art. The dianhydrides may vary depending on the application and desired properties of the resulting polymeric material. Examples of suitable dianhydrides include, but are not limited to, hexafluoradianhydrides (6FDA) and 3,3',4,4'-biphenyl tetracarboxylic dianhydride (BPDA), and napthalene six membered ring dianhydrides.

Scheme 3 illustrates the formation of a sulfonated polyimide formed by thermal imidization.

Scheme 3.

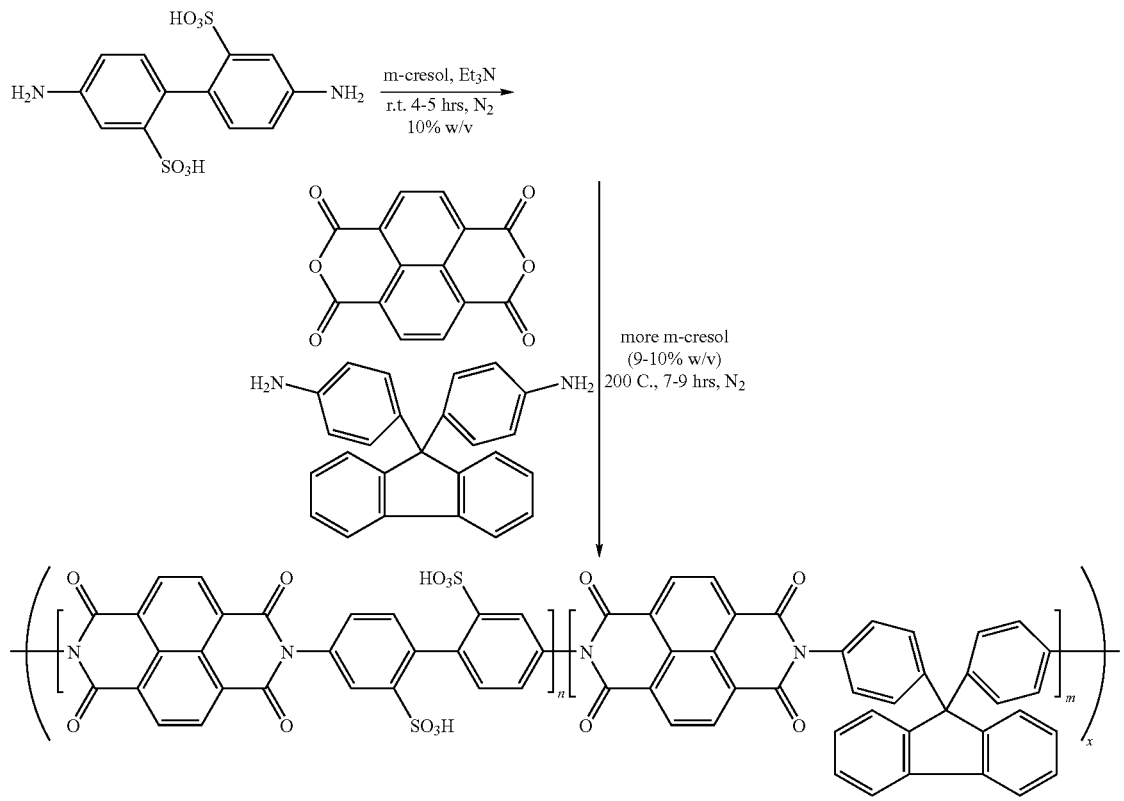

As discussed below in Example 2, the sulfonated polyimides formed in accordance with the present invention were conductive and were relatively thermally stable.

The operational temperature for fuel cells is important. Higher operating temperatures decreases the carbon monoxide poisoning of the electrocatalyst. However, as the temperature is increased, it becomes more difficult to keep the membrane of the fuel cell hydrated. Dehydrated membranes lose ionic conductivity and can result in poor contact between the fuel cell components due to shrinkage.

The above-discussed sulfonated polymeric membranes are useful as proton exchange membranes and ion exchange membranes. One important feature of the present invention is the combination of the sulfonated polymer with a heteropoly acid (HPA) to form a nanocomposite membrane. The heteropoly acid becomes highly dispersed in the nanocomposite membrane resulting in a substantially transparent membrane. The nanocomposite membranes of the present invention containing heteropoly acid allow the fuel cell to run at temperatures greater than 100° C. and improve the protonic conductivity of the membrane while decreasing the water absorption. This result is unexpected because protonic conductivity for most sulfonic acid-based membranes has typically been directly related to membrane water content. Additionally, the Nafion® based systems with a heteropoly acid usually result in low dispersion of the heteropoly acid and lower conductivity.

Inorganic heteropoly acids have typically been added to help retain water in the membrane on a local scale to increase proton conduction at low levels of hydration. The nanocomposite membranes of the present invention show increased protonic conductivity and decreased water absorption making them candidates for proton exchange membranes in fuel cells.

As used herein, "heteropoly acid," "inorganic heteropoly acid," and "HPA" have the meaning known to those skilled in the are and particularly as set forth in Katsoulis, D. E., "A Survey of Applications of Polyoxometalates" Chemical Reviews, vol. 1, pp. 359-387 (1998), herein specifically incorporated by reference in its entirety.

The nanocomposite membranes may be formed by solution-casting a mixture of the sulfonated polymer and the heteropoly acid. The weight ratio of heteropoly acid to sulfonated polymer may range from about 10% to about 60%. The ratio will vary depending on the type of sulfonated polymer and the type of heteropoly acid used. The types of sulfonated polymers that may be used include any of the above-described sulfonated polymers. The types of heteropoly acids include but are not limited to, phosphotungstic acid, phosphomolybdic acid, and zirconium hydrogen phosphate.

Some embodiments of the present invention is illustrated in the following examples. The examples are provided for illustration purposes and should not be construed as limiting the scope of the present invention.

EXAMPLE 1

Sulfonated Polysulfone

The desired sulfonated monomer was prepared according to Scheme 4. 4,4'-dichlorodiphenylsulfone was reacted with fuming sulfuric acid, followed by neutralization with sodium chloride and sodium hydroxide. This electrophilic aromatic substitution process provides derivatives that are meta to the sulfonyl group and ortho to the chlorine group. The chemical structure was confirmed by proton and carbon NMR, as well as by mass spectroscopy, infrared spectra and elemental analysis. The anticipated structures were obtained in yields approaching 80%.

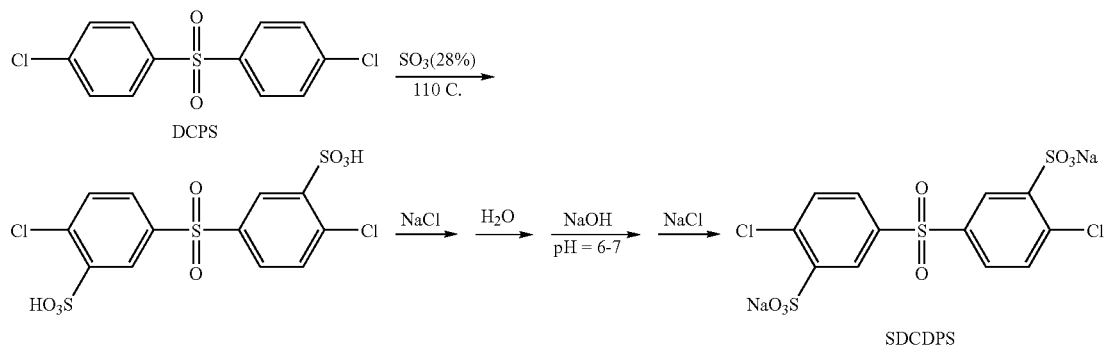

Scheme 4. Synthesis of SDCDPS

Sulfonated poly (arylene ether sulfones) were successfully synthesized via nucleophilic aromatic substitution polycondensation of biphenol, DCDPS and SDCDPS, at 0, 40, 60 and 100% of the SDCDPS relative to the total concentration of dihalide (DCDPS plus SDCDPS). The polymer synthesis (Scheme 1) involved condensing a controlled amount of the sulfonated activated halide (SDCDPS), the 4,4'-dichlorodiphenylsulfone and biphenol in NMP, which contained toluene as an azeotropic agent. The substituted activated halide is clearly less reactive and likely less soluble. Thus, temperatures needed for high molecular weight were increased somewhat higher than normal—to about 190° C. The polymerizations were conducted in the sodium salt form of SDCDPS to take advantage of the greatly enhanced stability of the sulfonic acid salt.

TABLE 1

Synthesis and Characterization of Biphenol Based Sulfonated Copolymer Compositions

| Polymer | Monomers (mmol) DCDPS | SDCDPS | NMP $[\eta]_{25°C.}$ (dl/g) | Water Content (%)[a] | Conductivity[c] S/cm |
|---|---|---|---|---|---|
| BPS-00 | 10 | 0 | 0.61 | 0.4 | 0 |
| BPSH-40 | 6 | 4 | 2.3 | 31 | 0.11 |
| BPSH-60 | 4 | 6 | 3.3 | 78 | 0.17 |
| BPS-100 | 0 | 10 | — | WS[b] | — |

[a] 24 hr at 25° C.;
[b] Water soluble;
[c] Nafion ® 1135 control was 0.12

The recovered yields were quantitative and intrinsic viscosities determined in NMP at 25° C. were high (Table 1). The intrinsic viscosities are influenced by the sulfonated groups, which is believed to be related to enhanced intermolecular associations. At this point, up to 1.2-$SO_3Na$ groups per repeating unit (60 mole % SDCDPS) introduced into the polymer chain allowed high molecular weight, tough, film-forming material to be obtained. In addition, all the sulfonated membranes showed higher water uptake than non-sulfonated membrane, due to the introduction of hydrophilic sulfonate groups. (Table 1.) The 100% SDCDPS system was water soluble. Sodium formed membranes (BPS) were transferred to their corresponding acid form (BPSH) using a dilute acid solution for characterization and conductivity measurements.

The successful introduction of the sodium sulfonate groups was confirmed by the FT-IR spectra where strong characteristic peaks at 1030 $cm^{-1}$ and 1098 $cm^{-1}$ were assigned to symmetric and asymmetric stretching of $SO_3Na$. There was no related mode for the unsubstituted control material prepared from biphenol and DCDPS.

Non-aqueous potentiometric titration was used to determine the content of proton-exchange groups (—$SO_3H$) quantitatively. The dried BPSH solutions in DMAC were titrated by standard tetramethyl ammonium hydroxide solution (~0.05N, in iso-propanol). One sharp titration end-point was observed indicating a strong acid (—$SO_3H$) and base reaction. Assuming that all sulfonated monomer was incorporated into the polymer chain, the theoretical ion exchange capacity (IEC) for BPSH-40 and BPSH-60 are 1.7 and 2.4 meq/g.

respectively, which are in good agreement with experimental data in Table 2. All the above results indicate that $SO_3Na$ and after conversion to the proton conductive groups, —$SO_3H$, could be introduced into polymer via a sulfonated monomer without any side reactions, which are often observed with post sulfonation methods. Moreover, the ionic conductor was located on a deactivated phenyl ring, which should provide enhanced stability.

TABLE 2

Short-term thermal stability of —$SO_3H$ groups of 40 or 60 mole % copolymers as indicated by Intrinsic Viscosity and IEC Retention at 25° C.[a]

| Aging | BPSH-40 | | BPSH-60 | |
|---|---|---|---|---|
| T, °C. | IV[b] (dL/g) | IEC (meq/g) | IV[b] (dL/g) | IEC (meq/g) |
| 25° C. | 2.3 | 1.5 | 3.3 | 2.2 |
| 100° C. | 2.1 | 1.6 | 3.1 | 2.3 |
| 140° C. | 2.4 | 1.6 | 3.2 | 2.3 |
| 180° C. | 2.4 | 1.6 | 3.2 | 2.1 |
| 220° C. | 2.1 | 1.6 | 3.5 | 2.2 |
| 260° C. | 2.2 | 1.5 | PS*** | — |

[a]The BPSH membranes were treated at each temp. for 30 min. in air before Intrinsic Viscosity and IEC determination.
[b]Intrinsic Viscosities were determined in NMP at 25° C., ***Partially soluble, indicating the thermal onset of branching.

The stability of —$SO_3H$ groups was investigated by the combination of non-aqueous potentiometric titration and intrinsic viscosity measurements. The free acid membrane, which is in the form that would be of greatest interest in proton exchange membranes for fuel cells, showed significantly more stability than might have been expected from small model molecule experiments. The molecular structure was stable for 0.5 hour up to 220° C. at air, as proven by the stable IEC and intrinsic viscosity values (Table 2). Without intending to be bound by theory, it is believed that the deactivated phenyl rings will be better defined locations for the ion conductivity, since they are placed on the monomer prior to polymerization, and more stable to desulfonation since the anticipated intermediate carbocation required for desulfonation is more difficult to stabilize on such a sulfone deactivated ring.

The fully hydrated acid form membrane had a room temperature (25° C.) proton conductivities of 0.11 and 0.17 S/cm for the 40/60 and 60/40 copolymers, respectively, while the conductivity of Nafion® 1135 (IEC 0.91 meq/g) was 0.12 S/cm under the same conditions. The higher conductivity of 60% BPSH in comparison to Nafion® 1135 is most likely a result of the greater IEC and water uptake of BPSH. Both factors were previously shown to affect the observed protonic conductivity of Nafion®. The water uptake of 60% PSH was 70% by weight as opposed to a water uptake of 37% by the control Nafion® membrane. Conductivity measurements were performed in a conductivity cell illustrated in FIG. 1. The conductivity cell includes a non-conductive polymer block 1 with thumbscrews 2. There is an open area 3 in the polymer block 1 to allow equilibration with the environment. A membrane 4, such as a proton exchange membrane, is sandwiched between the polymer block 1 and a blackened platinum foil electrode 5. The electrodes 5 have leads 6 for carrying a conductivity signal.

Poly(arylene ether sulfone)s containing up to 1.2 sulfonate groups per repeating unit (60 mole %) were successfully prepared by direct polymerization of the sulfonated activated halide using otherwise fairly similar "polysulfone" polymerization conditions. Tough acid form films obtained by solution casting method showed very high proton conductivity and good stability. Thus, this material and materials made by similar processes should be useful for new proton exchange membranes for fuel cells.

EXAMPLE 2

Sulfonated Polyimides

Sulfonated polyimides were made using DADPDS and BPDA in mol % of 0, 10, 25, 40, 60, 75, and 100. These sulfonated polyimides were then formed into membranes. Ionic conductivity and water uptake measurements were obtained and are reported in Table 3. Membranes containing 10% through 40% were conductive and had water uptakes ranging from 6.2 to 28.5% w/w. These materials were also examined for thermal stability. As shown in Table 4, the temperature at which the membranes exhibited a 5% weight loss in air ranged from 260 to 541.degree. C.

TABLE 3

Ionic Conductivity and Water Uptake For BPDA/s-DADPS.

| Polymer | s-DADPS (mol %) | IEC (meq/g) | Water Uptake[a] (% w/w) | $\lambda^a$ ($H_2O$ mol./ $SO_3$) | Conductivity[b] × $10^2$ (S/cm) |
|---|---|---|---|---|---|
| BPDA/s-DADPS-00 | -0- | -0- | c | C | — |
| BPDA/s-DADPS-10 | 10 | 0.341 | 6.2 | 12.12 | 0.4 |
| BPDA/s-DADPS-25 | 25 | 0.784 | 15.9 | 13.52 | 0.7 |
| BPDA/s-DADPS-40 | 40 | 1.161 | 28.5 | 16.36 | 1.5 |
| BPDA/s-DADPS-60 | 60 | 1.583 | 37.7 | 15.87 | — |
| BPDA/s-DADPS-75 | 75 | 1.852 | 55.5 | 16.59 | — |
| BPDA/s-DADPS-100 | 100 | 2.230 | W.S | W.S | W.S |

TABLE 4

Thermal Stability For BPDA/s-DADPS.

| Polymer | Sulfonated diamine (mol %) | m/n | $[\eta]^a$ dL/g | 5% weight loss in air[b] (° C.) | $T_g^c$ (° C.) |
|---|---|---|---|---|---|
| BPDA/s-DADPS-00 | 0 | 0/10 | 0.83 | 541 | 201 |
| BPDA/s-DADPS-10 | 10 | 1/10 | 1.21 | 319 | 212 |
| BPDA/s-DADPS-25 | 25 | 2.5/7.5 | 1.78 | 310 | 226 |
| BPDA/s-DADPS-40 | 40 | 4/6 | 2.31 | 298 | 242 |
| BPDA/s-DADPS-60 | 50 | 6/4 | 3.17 | 287 | n/o |
| BPDA/s-DADPS-75 | 60 | 7.5/2.5 | 3.82 | 272 | n/o |
| BPDA/s-DADPS-100 | 100 | 10/0 | 4.35 | 260 | n/o |

Membranes were also formed from sulfonated polyimides made from BPDA and DADPPO in mol % of 0, 10, 25, 40, 60, 75, and 100. As can be seen from Table 5, membranes containing 10% through 40% were conductive and had water uptakes ranging from 4.2 to 20.7% w/w. As shown in Table 6, the temperature at which the membranes exhibited a 5% weight loss in air ranged from 257 to 541.degree. C.

TABLE 5

Ionic Conductivity and Water Uptake For BPDA/s-DADPPO.

| Polymer | s-DADPPO (mol %) | IEC (meq/g) | Water Uptake[a] (% w/w) | $\lambda^a$ ($H_2O$ mol./ $SO_3$) | Conductivity[b] × $10^2$ (S/cm) |
|---|---|---|---|---|---|
| BPDA/s-DADPPO-00 | -0- | -0- | c | c | c |
| BPDA/s-DADPPO-10 | 10 | 0.17 | 4.2 | 10.2 | 0.27 |
| BPDA/s-DADPPO-25 | 25 | 0.43 | 10.3 | 12.45 | 0.45 |
| BPDA/s-DADPPO-40 | 40 | 0.69 | 20.7 | 13.36 | 0.92 |
| BPDA/s-DADPPO-60 | 60 | 1.03 | 31.2 | 12.87 | — |
| BPDA/s-DADPPO-75 | 75 | 1.29 | 43.6 | 13.65 | — |
| BPDA/s-DADPPO-100 | 100 | 1.72 | W.S | W.S | W.S |

TABLE 6

Thermal Stability For BPDA/s-DADPPO

| Polymer | Sulfonated diamine (mol %) | m/n | $[\eta]^a$ dL/g | 5% weight loss in air[b] (° C.) | $T_g^c$ (° C.) |
|---|---|---|---|---|---|
| BPDA/s-DADPPO-00 | 0 | 0/10 | 0.83 | 541 | 201 |
| BPDA/s-DADPPO-10 | 10 | 1/10 | 0.97 | 317 | 208 |
| BPDA/s-DADPPO-25 | 25 | 2.5/7.5 | 1.45 | 320 | 222 |
| BPDA/s-DADPPO-40 | 40 | 4/6 | 2.00 | 296 | 224 |
| BPDA/s-DADPPO-60 | 60 | 6/4 | 2.54 | 283 | 238 |
| BPDA/s-DADPPO-75 | 75 | 7.5/2.5 | 3.22 | 270 | n/o |
| BPDA/s-DADPPO-100 | 75 | 10/0 | 3.72 | 257 | n/o |

EXAMPLE 3

Proton Exchange Membrane Nanocomposites

Polymer Synthesis and Composite Membrane Preparation 3.3'-disulfonated 4'4-dichlorodiphenylsulfone (SDCDS) was prepared by the reaction of 4,4'-dichlorodiphenylsulfone (DCDPS, BP Amoco) and fuming sulfuric acid, followed by neutralization with sodium chloride and sodium hydroxide. The chemical structure of this monomer was confirmed by $^1$H and $^{13}$C NMR, as well as by mass spectroscopy, infrared spectra and elemental analysis. Biphenol-based sulfonated poly(arylene ether sulfone)s were synthesized by direct polycondensation of 4,4'-biphenol (Eastman Chemical), DCDPS and SDCDPS, at 0, 20, 40, and 60 mole % of the SDCDPS. Copolymerizations proceeded quantitatively to high molecular weight in N-methyl-2-pyrrolidone at 190° C. in the presence of anhydrous potassium carbonate (Scheme 1). The copolymers in their salt form were then converted to the corresponding acid form by boiling in dilute sulfuric acid solution, followed by washing with deionized water for 24 hours and vacuum drying at 80° C. for 24 hours.

The composite membranes were prepared using the acid form sulfonated poly(arylene ether sulfone)s (BPSH) and phosphotungstic acid (HPA, Fluka Chemicals) by a solution-casting method. The BPS polymer and the HPA powder was added to dimethylacetamide (DMAc) (10% w/v) and the solution was stirred for 12 hour at 80° C. The weight ratio of the HPA to BPS polymer was varied from 0 to 60%. The solution was cast onto a clean glass plate, dried by a heat lamp at 80° C. for 24 hours under dry nitrogen flow, and then under vacuum at 80° C. for 24 hours. The transparent cast films had a yellowish tint and were 150 um thick with little variation in thickness.

Morphology

Tapping mode atomic force microscopy (TM-AFM) was performed with a Digital Instruments Dimension 3000, using the micro-fabricated cantilevers with a force constant of approximately 40 N/m. The samples were imaged in relative humidity of about 35%. Field emission scanning electron microscopy (FE-SEM, Leo 1550 Gemini) was carried out at a low incident beam voltage (7 kV) to minimize charging. Samples were fractured in cryogenic conditions and vacuum sputtered with a thin layer of gold before imaging.

The microphase separation of the matrix polymer provides the template for the nanocomposite membrane. During solution casting of the membrane, coordination (possibly hydrogen bonding) of the sulfonic acid moiety attached to the polymer backbone and the HPA causes in the inorganic HPA to reside primarily in the ionic hydrophilic domains. Microphase separation of the base polymers for BPSH(O), BPSH(20), BPSH(40), PBSH(50), and PBSH(60) were observed by TM-AFM and compared to the nanocomposites.

Field emission scanning electron micrographs of nanocomposite showed that a large fraction of the HPA is very well dispersed, however, some larger aggregates were observable. The scanning electron micrograph revealed that the HPS-rich domains are roughly the same size as the ionic domains scanned in the atomic force micrographs. The FE-SEM of the pure matrix polymer does not reveal any features.

Water Uptake

The water uptake of the composite membranes was determined by a simple weight-difference approach. The composite membranes were first immersed in deionized water at room temperature for 24 hours. The wet membranes were then blotted dry to remove surface droplets and quickly weighed. The wet membranes were vacuum dried at 80-100° C. and weighed again. The water uptake of the membranes was calculated by the weight gain of absorbed water with reference to the dry membrane and reported as weight percent water absorption.

Mechanical Properties

Tensile properties were measured on an Instron (model 4204) using crosshead speed of 5 mm/min. Solution cast films having a film thickness of 130 μm were prepared according to ASTM 638-94 (Type V). The specimens were dried at 80° C. and subsequently tested at room temperature under approximately 35% relative humidity.

Dynamic Mechanical Analysis (DMA) was performed on a TA Instruments DMA 2980 with a submersion film clamp. The submersion film clamp allows dynamic analysis with the sample fully hydrated in a liquid water environment. To begin the measurement, a 1 Hz frequency was applied at ambient humidity. After a plateau storage modulus was reached, water at room temperature was then pipetted into the immersion cell while the measurement continued. The corresponding modulus drop was recorded and the measurement continued until a new plateau modulus was reached.

Solubility of Nanocomposite Components

There have been several reports in the literature of composite proton exchange membranes. Both polymer/polymer and inorganic/organic composites have been applied in fuel cell applications.

Component solubility was determined primarily by clarity of the membranes. In a transparent composite with components that have dissimilar indexes of refraction, transparent membranes are only possible if the dispersed component exists in particles of less than 0.1 μm.

Extraction of the normally water-soluble HPA component from the membrane was also a concern. AFM micrographs of a Nafion® and BPS matrix after soaking with liquid water were taken. Holes could be seen in the Nafion® composite where the HPA had been extracted, while no such features appeared in the HPA/BPS nanocomposite. The Nafion®-based composite was opaque and extraction of the HPA component was confirmed by gravimetric measurements. The BPS-based composite was transparent and the extraction of HPA at 30° C. is on the order of only 1-2%.

Effect of Sulfonation and Water Uptake on Conductivity

Figure 2B:
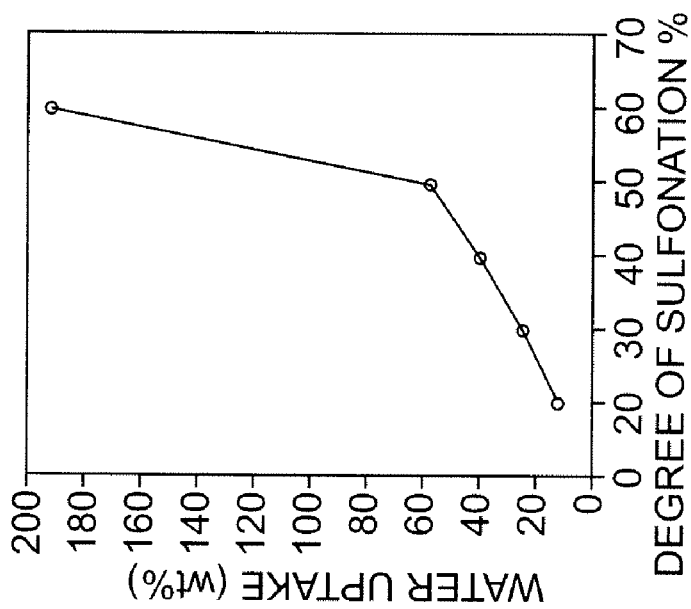
FIG. 2 includes plots showing the effect of sulfonation on conductivity (a) and water uptake (b)
Figure 2A:
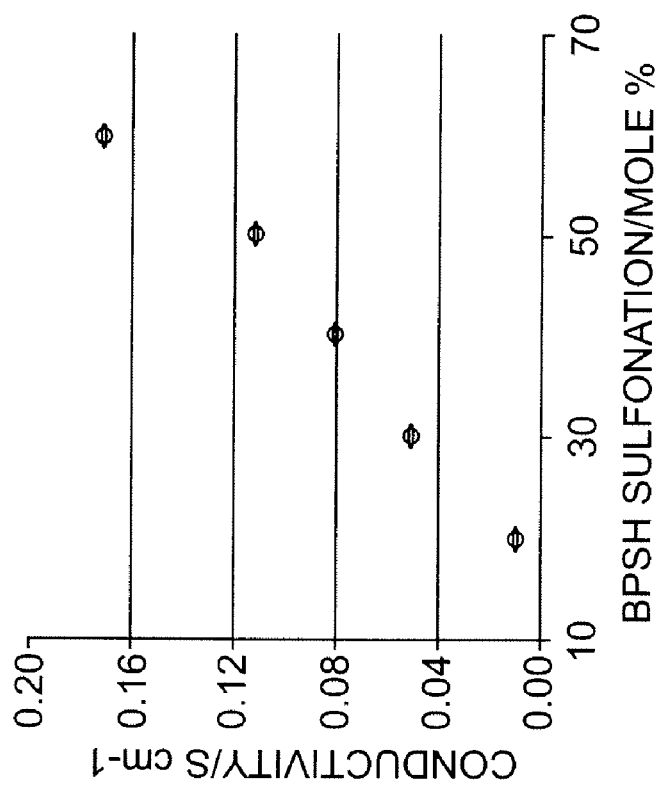

The mole % disulfonation of the polymer matrix has a large effect on both water uptake and its protonic conductivity. Conductivity at room temperature under full hydration conditions was determined using a Solatron 1260 Impedance/Gain-Phase Analyzer over the frequency range of 10 Hz-1 MHz. The cell geometry was chosen to ensure that the membrane resistance dominated the response of the system. The resistance of the film was taken at the frequency which produced the minimum imaginary response. The conductivity of the membrane can be calculated from the measured resistance and the geometry of the cell. As shown in FIGS. 2(a) and 2(b), as the sulfonic acid content increases, both the percent water absorption and conductivity of the base polymer increases.

Maximizing the conductivity of the membrane is desirable to increase the current density of the fuel cell. However, the conductivity must be balanced with the water absorption of the membrane. Too great a water uptake results in membrane swelling and may cause poor contact between the components of the fuel cell.

Figure 3:
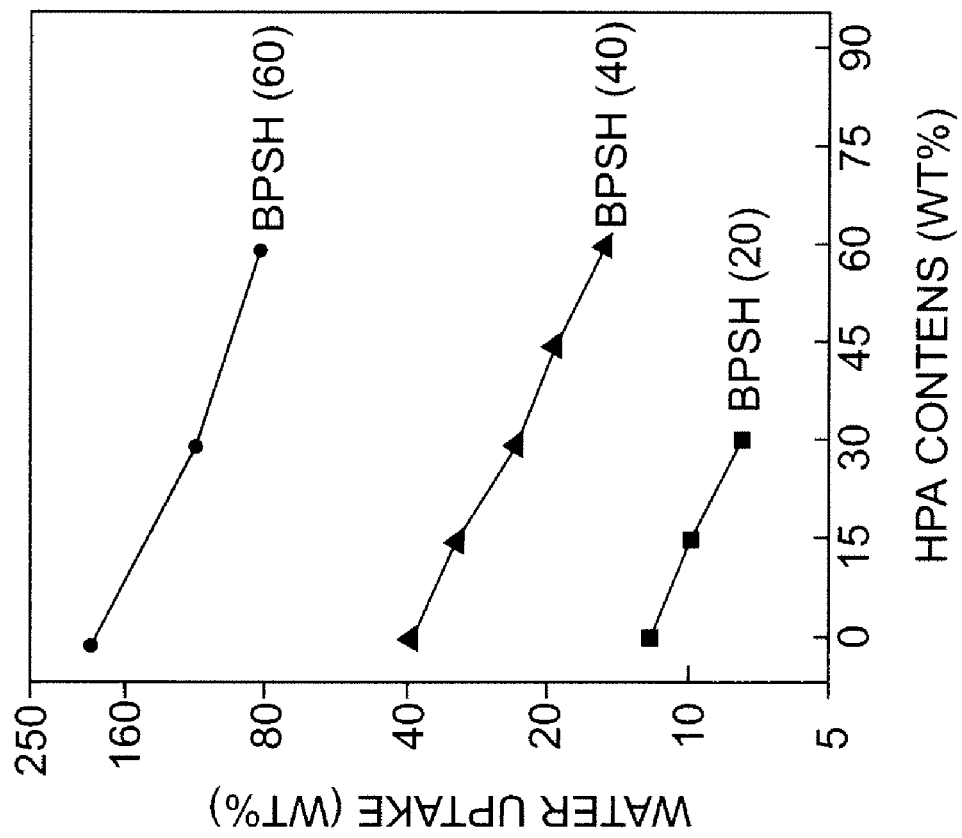
FIG. 3 is a plot showing the water uptake of nanocomposite PEMs as a function of sulfonation level and HPA content.

Somewhat surprisingly, the nanocomposite membranes displayed both decreased water absorbance and increased conductivity over the pure polymers. Increasing the weight fraction of the HPA in the nanocomposite decreases the water uptake systematically. The effect of HPA on the water uptake of the composite membranes is shown in FIG. 3.

Decreased water uptake is attributed to the interaction between sulfonic acid and the HPA. Aside from decreasing the water uptake of the naoncomposite, this interaction prevents the water-soluble HPA from being extracted in a humid fuel cell environment.

Figure 4:
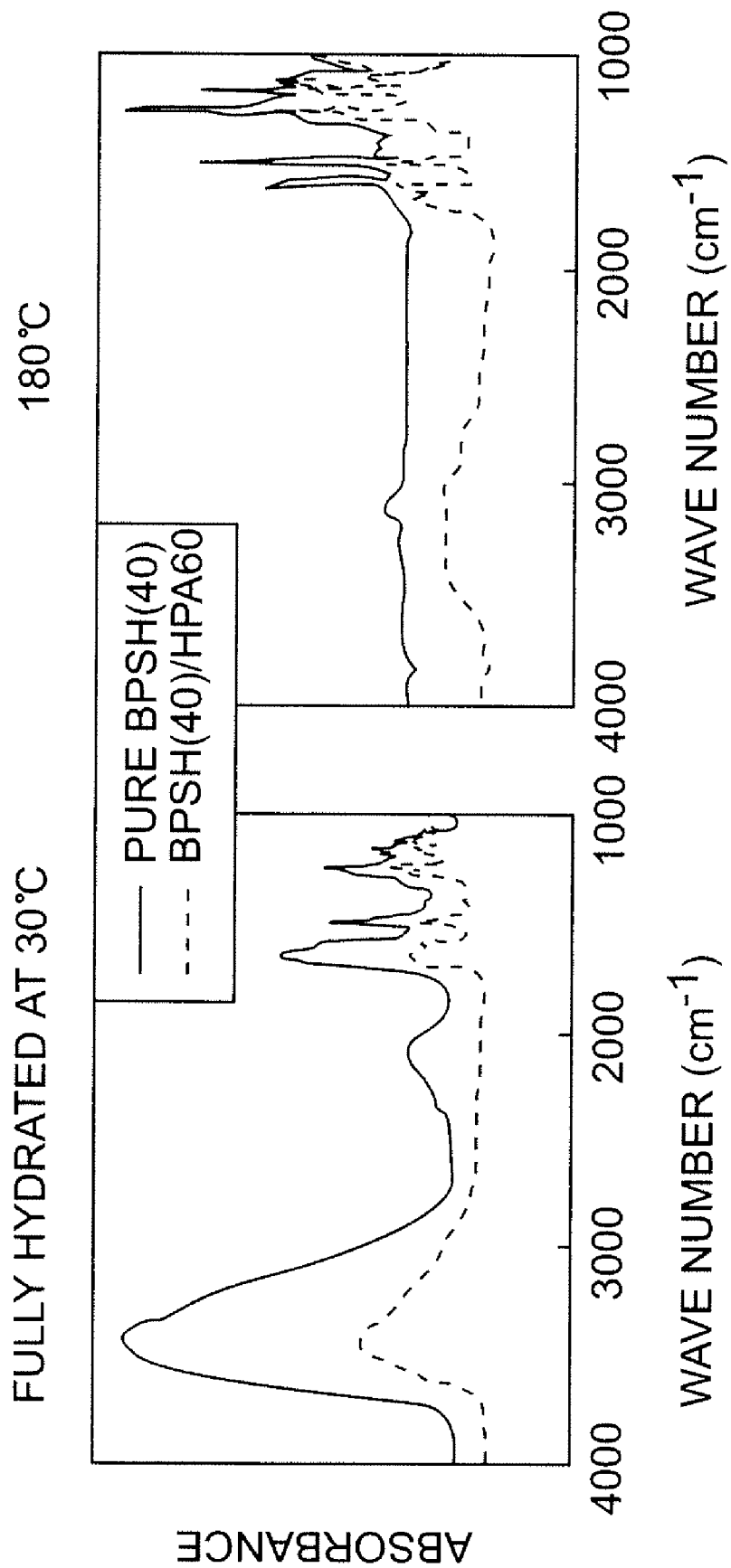
FIG. 4 are FTIR spectra of membranes when fully hydrated and at 180° C.

Specific interactions between the HPA and the sulfonic acid were elucidated by FTIR spectroscopy. Perhaps the most important property of the HPA/BPS composites is their ability to retain water at greater temperatures than the pure polymers. FTIR was used to show the presence of water in the nanocomposite at high temperatures. In FIG. 4 the broad peak from 3500 to 2500 $cm^{-1}$ shows the water is retained in the nanocomposite even at 180° C. whereas no water is present in the pure BPSH membrane at that temperature.

Figure 5:
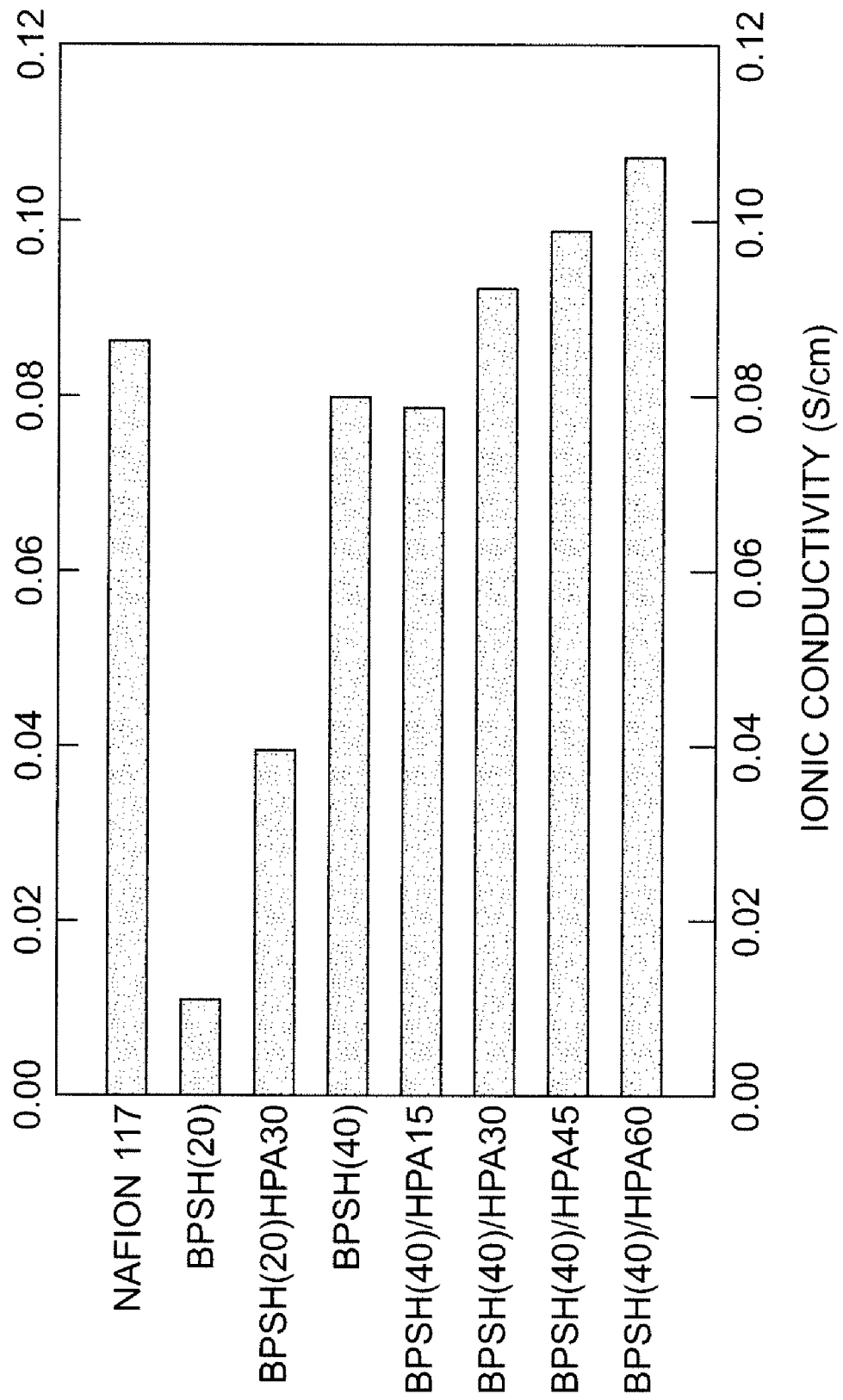
FIG. 5 is a plot of conductivity of nanocomposite and polymer membranes.

Interactions between the HPA and the sulfonic acid moiety can also help to explain the increase in conductivity of the composites even though the water content is lower. The HPA helps to increase the acidity or disassociation of the proton from the sulfonate group. FIG. 5 shows the conductivity of the HPA/BPS nanocomposites as well as the pure BPS and the Nafion® membranes.

Figure 6:
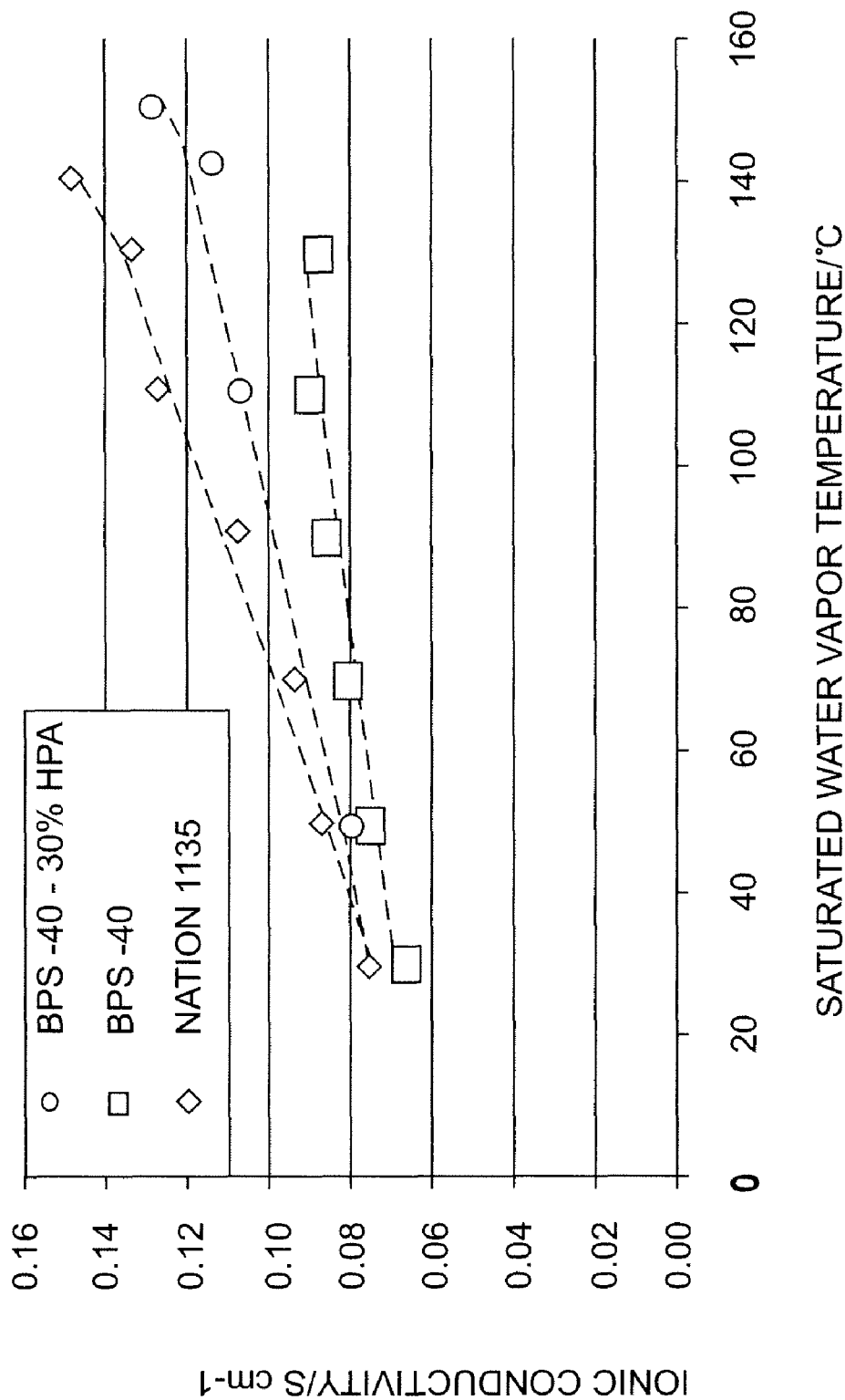
FIG. 6 is a plot of protonic conductivity in saturated water vapor.

The conductivity of the nanocomposites is also greater than the matrix polymers in a water vapor environment at elevated temperatures. Conductivity measurements were made up to 130° C. in 100% humidity. FIG. 6 displays the membrane conductivities as a function of temperature.

Mechanical Properties

Figure 7:
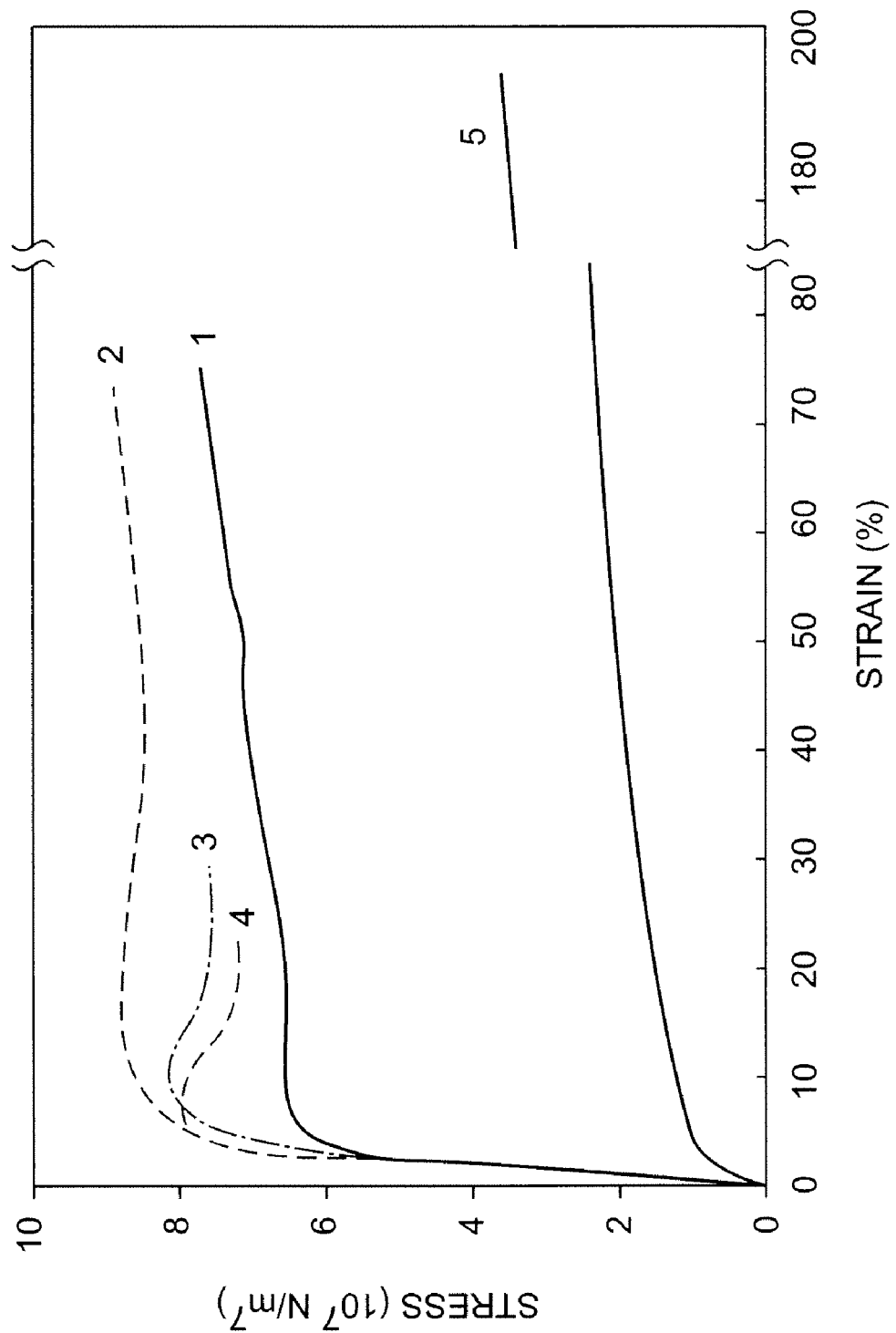
FIG. 7 is a plot of stress strain behavior of PEMs.

The mechanical properties of Nafion® are one of its major drawbacks as a high-temperature PEM. The low glass transition temperature and modulus of Nafion® are depressed even further due to its substantial water absorption. Wholly aromatic poly(arylene ether)s are known for their high glass transition temperatures and high moduli. The stress-strain behavior of the membranes are shown in FIG. 7. The material in FIG. 7 are identified as BPSH-40 without the addition of phosphotungstic acid (curve 1), BPSH-40 with the addition of 30 wt % phosphotungstic acid (curve 2), BPSH-40 with the addition of 60 wt % phosphotungstic acid (curve 3), BPSH-40 with the addition of phosphotungstic acid (curve 4), and Nafion® (curve 5).

Nafion® behaves like a rubbery material at ambient conditions, while the other sulfonated systems have properties akin to high-performance thermoplastics. The sulfonated systems with HPA (curves 2-4) showed increased strength above that for the sulfonated system without HPA (curve 1).

Figure 8:
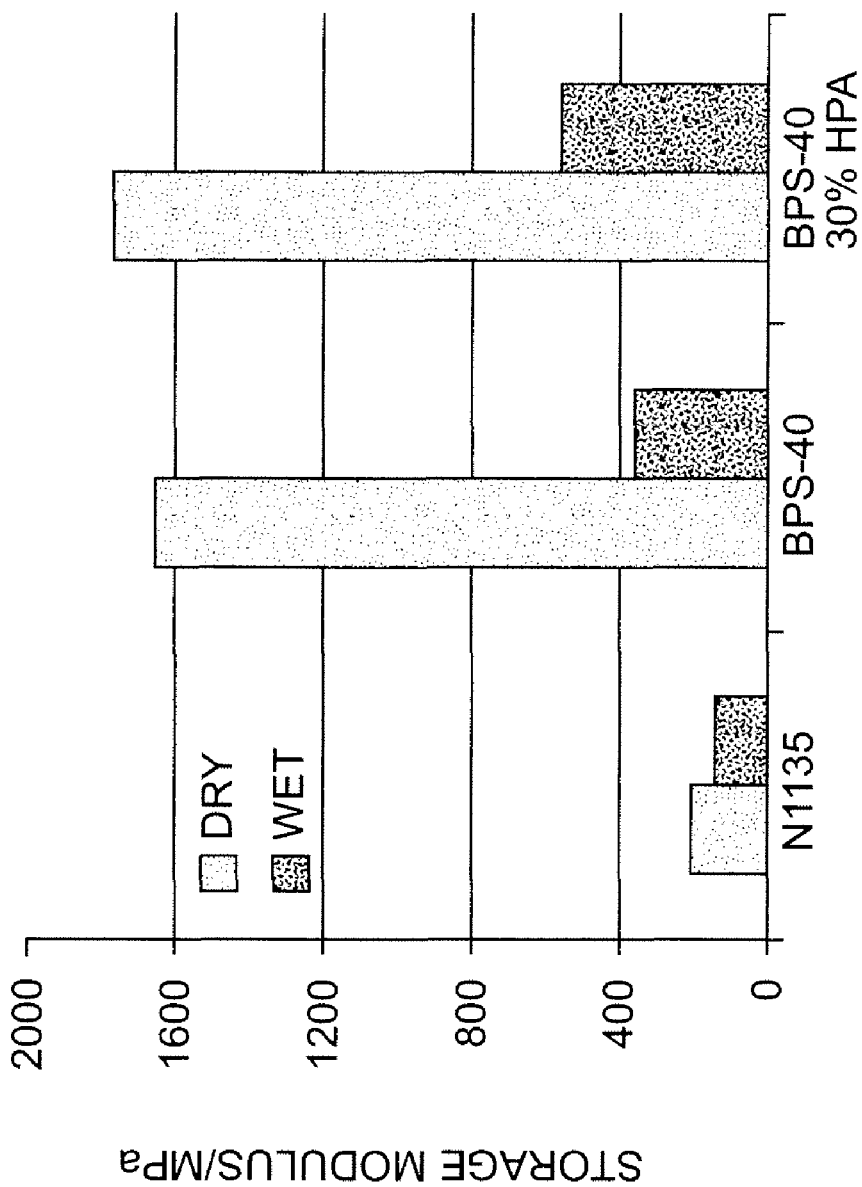
FIG. 8 is a plot of the storage modulus of PEMs in the dry and wet state.

In-situ DMA was performed to assess the effect of water uptake on the modulus of the materials. As can be seen from FIG. 8, the modulus of the materials drops when the membranes are exposed to liquid water.

Comparing the moduli of the materials in a water environment, the two BPS-based membranes have a higher modulus than Nafion® supporting the hypothesis that the stiff-backboned poly(arylene ethers) have a higher modulus in both the dry and wet environments. As could be expected, the nanocomposite membrane incorporating 30 wt % HPA has a greater modulus in both the dry and wet state than the unfilled membrane. The modulus of Nafion® only drops by a factor of 1.4 while the moduli of the BPSH-based materials (pure polymer and nanocomposite) drop by factors of 4.5 and 3.0, respectively. This is due to the fact that the BPSH-based materials drop through their glass transition temperature from the glassy state to the rubbery plateau whereas Nafion® begins as a rubber material in the dry state. In sulfonated proton exchange membranes, the water uptake decreases the glass transition of the polymers, but because of the stiff-backbone, the modulus remains greater than that of Nafion®.

Proton exchange nanocomposite membranes display some distinct advantages over their purely polymeric counterparts. The composite membranes showed decreased water uptake without sacrificing protonic conductivity. This is an important breakthrough in hydrated proton exchange membranes, because typically any inorganic filler has hampered the conductivity of the membrane. In addition, specific interactions between the sulfonic acid and the HPA prevent the normally water soluble HPA from being extracted from the composite in an aqueous environment.

The chemistry of the matrix polymer is important for two reasons. First, the polymer chemistry can be optimized to coordinate with the inorganic component of the composite. Second, the polymer chemistry, namely the ampiphillic nature of the chain, determines the microphase morphology of the composite because of the strong binding of the sulfonic acid and HPA. The inorganic HPA helps retain water in the membrane at temperatures leading to good conductivity above the boiling point of water and increases the modulus of the polymeric material. As the operation temperature fuel cells is increased above 120° C. to decrease the poisoning effects of carbon monoxide in the fuel, humidification of the proton exchange membrane becomes more difficult. The HPA nanocomposites reported here will be able to retain their good protonic conductivity at lower relative humidities and will reduce mechanical failures experienced with lower modulus membrane materials.

EXAMPLE 4

Stability Study for Sulfonated Polysulfone Membranes

Sulfonated polysulfone (BPSH-40) was formed by condensing DCDPS (60%) and SDCDPS (40%) with 4,4' biphenol. A membrane was formed from the BPSH-40 polymer and placed in a pressure bomb at a controlled temperature of 120° C. and 100% humidity. The membrane was chemically and mechanically stable for over 1000 hrs.

While the invention has been described in terms of its preferred embodiments, those skilled in the art will recognize that the invention can be practiced with modification within the spirit and scope of the appended claims.

What is claimed is:

1. A proton exchange membrane comprising:
   a sulfonated polyimide membrane formed from
      a sulfonated polymer having the chemical structure:

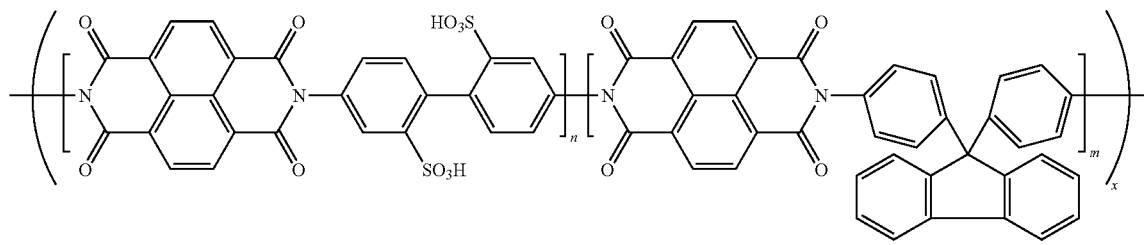

wherein n/n+m ranges from about 0.001 to about 1; and
an inorganic heteropoly acid in an amount at 10-60 wt % of said sulfonated polymer, said inorganic heteropoly acid being dispersed in said sulfonated polyimide in particles of less than 0.1 µm whereby said sulfonated polyimide membrane is substantially transparent.

2. The proton exchange membrane of claim 1 wherein the inorganic heteropoly acid is selected from the group consisting of phosphotungstic acid, phosphomolybdic acid, and zirconium hydrogen phosphate.

3. The proton exchange membrane of claim 2 wherein the inorganic heteropoly acid is phosphotungstic acid.

* * * * *